United States Patent
Bijwaard et al.

(10) Patent No.: US 8,249,068 B2
(45) Date of Patent: Aug. 21, 2012

(54) METHOD AND APPARATUS FOR ESTABLISHING MULTICAST GROUPS

(75) Inventors: Dennis Bijwaard, Enschede (NL); Arjan deHeer, Hengelo (NL); Dirk-Jaap Plas, Enschede (NL)

(73) Assignee: Alcatel Lucent, Paris (FR)

( * ) Notice: Subject to any disclaimer, the term of this patent is extended or adjusted under 35 U.S.C. 154(b) by 331 days.

(21) Appl. No.: 11/551,516

(22) Filed: Oct. 20, 2006

(65) Prior Publication Data
US 2008/0095183 A1 Apr. 24, 2008

(51) Int. Cl.
 *H04L 12/28* (2006.01)
(52) U.S. Cl. ......... 370/390; 709/227
(58) Field of Classification Search ........ 370/432, 370/390; 709/227; 707/102
See application file for complete search history.

(56) References Cited

U.S. PATENT DOCUMENTS

| | | | |
|---|---|---|---|
| 5,956,491 A | 9/1999 | Marks | |
| 6,587,943 B1* | 7/2003 | Hardjono | 713/163 |
| 2003/0108000 A1 | 6/2003 | Chaney et al. | |
| 2004/0132448 A1* | 7/2004 | Torres et al. | 455/427 |
| 2004/0193635 A1* | 9/2004 | Hsu et al. | 707/102 |
| 2005/0060411 A1* | 3/2005 | Coulombe et al. | 709/227 |
| 2005/0233776 A1 | 10/2005 | Allen et al. | |
| 2006/0034202 A1* | 2/2006 | Kuure et al. | 370/312 |
| 2006/0221937 A1* | 10/2006 | Olivier et al. | 370/352 |
| 2006/0268873 A1* | 11/2006 | Tonjes et al. | 370/392 |
| 2007/0054687 A1* | 3/2007 | Akita et al. | 455/518 |

FOREIGN PATENT DOCUMENTS
WO  WO 01/67787 A2   9/2001

OTHER PUBLICATIONS

International Search Report & Written Opinion corresponding PCT/US2007/022032, Apr. 17, 2008, Lucent Technologies Inc.
Wittmann R and Zitterbart M: "Multicast Communication: Protocols and Applications" Morgan Kaufmann Publishers, San Francisco, May 12, 2000, XP002475516, p. 40-p. 44; p. 286-p. 302.
Henning Schulzrinne et al: "The Session Initiation Protocol: Internet-Centric Signaling" IEEE Comunications Magzine, IEEE Service Center, Piscataway, US, vol. 38, No. 10, Oct. 2000 92000-10), pp. 134-141, XP011091370.
RFC2974, "Session Announcement Protocol", Network Working Group, M. Handley et al., Oct. 2000.
Apr. 26, 2011 Office Action in Chinese Patent Application No. 200780038777.5, Lucent Technologies Inc., Applicant, 6 pages.

* cited by examiner

*Primary Examiner* — Robert Wilson
*Assistant Examiner* — Wei Zhao
(74) *Attorney, Agent, or Firm* — Wall & Tong, LLP

(57) ABSTRACT

The invention includes a method and apparatus for dynamically establishing a multicast group. The method includes receiving, from a first user device, a request to establish a multicast group including a plurality of parameters adapted for establishing the multicast group, obtaining a multicast address for the multicast group, and establishing the multicast group using the assigned multicast address and the parameters. The parameters include at least one multicast group definition parameter and at least one multicast session description parameter. The multicast address and at least a portion of the parameters are adapted for being provided to a second user device to enable the second user device to dynamically join the multicast group.

20 Claims, 5 Drawing Sheets

100

METHOD AND APPARATUS FOR ESTABLISHING MULTICAST GROUPS

FIELD OF THE INVENTION

The invention relates to the field of communication networks and, more specifically, to establishing multicast groups.

BACKGROUND OF THE INVENTION

Internet Protocol (IP) multicast is a bandwidth-conserving technology that delivers IP traffic conveying a single stream of information from a transmitter to multiple receivers which form a multicast group. IP multicast may be used for numerous applications such as videoconferencing, distance learning, software distribution, and the like. IP multicast packets are replicated in the network by multicast routers supporting various multicast protocols for managing multicast group membership, replicating IP multicast packets, and performing like functions associated with IP multicast. Dynamic establishment of multicast groups is currently performed using the Session Announcement Protocol (SAP), including the associated Session Directory Tool (SDR), as defined in RFC2974, which uses a distributed session directory and session announcements to dynamically establish a multicast group.

SUMMARY OF THE INVENTION

Various deficiencies in the prior art are addressed through the invention of a method and apparatus for dynamically establishing a multicast group. The method includes receiving, from a first user device, a request to establish a multicast group including a plurality of parameters adapted for establishing the multicast group, obtaining a multicast address for the multicast group, and establishing the multicast group using the assigned multicast address and the parameters. The parameters include at least one multicast group definition parameter and at least one multicast session description parameter. The multicast address and at least a portion of the parameters are adapted for being provided to a second user device to enable the second user device to dynamically join the multicast group.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention enables dynamic establishment of multicast groups. The present invention enables dynamic establishment of multicast groups by user devices. The present invention enables signaling other than multicast protocol signaling (e.g., Session Initiation Protocol (SIP) signaling, Hypertext Transfer Protocol (HTTP) signaling, and the like, as well as various combinations thereof) to be used for establishing IP multicast groups. As such, the present invention supports robust, dynamic establishment of multicast groups.

Figure 1:
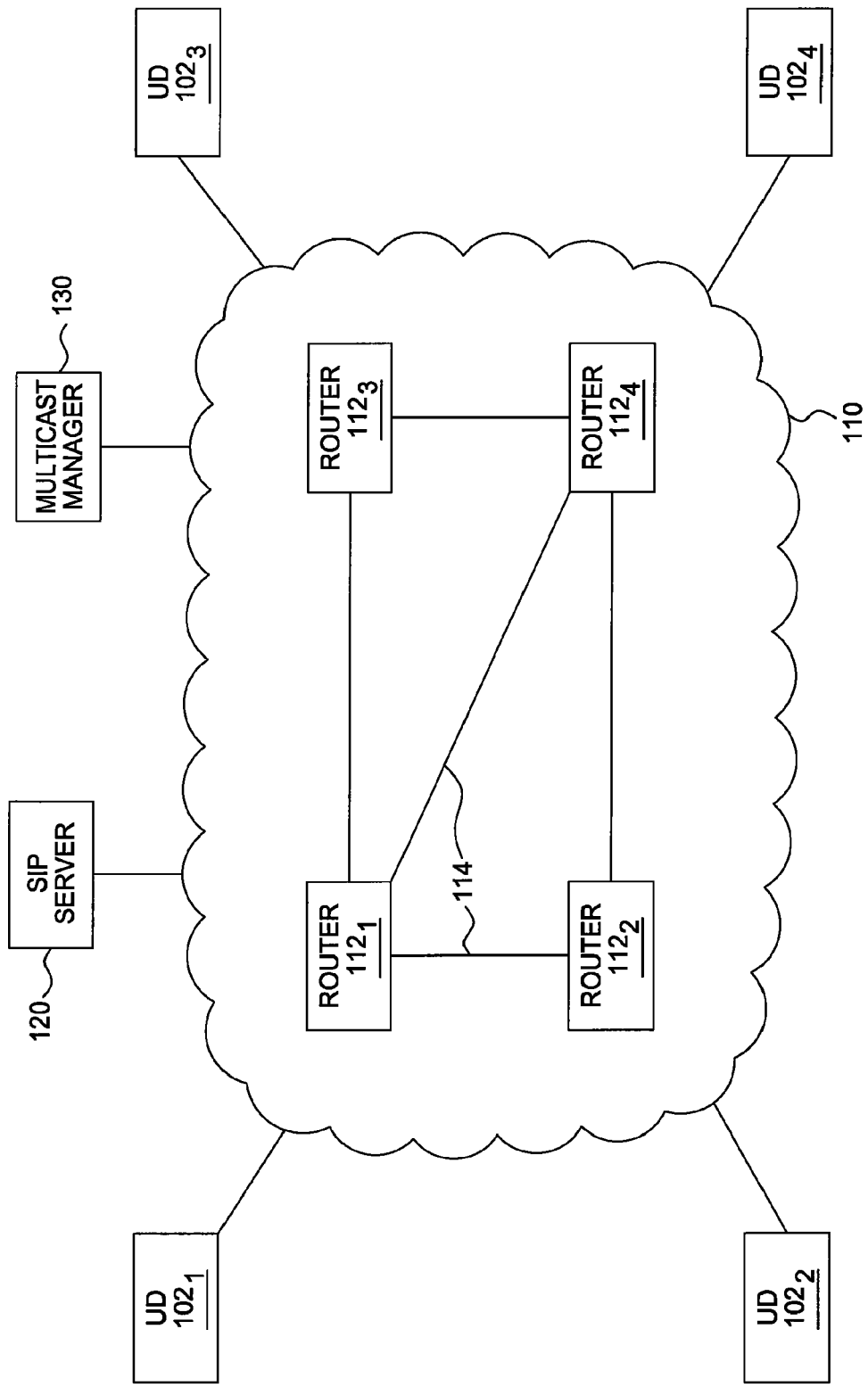
FIG. 1 depicts a high-level block diagram of a communication network.

FIG. 1 depicts a high-level block diagram of a communication network. Specifically, communication network 100 of FIG. 1 includes a plurality of user devices (UDs) $102_1$-$102_4$ (collectively, UDs 102), a transport network (TN) 110, a SIP server (SS) 120, and a Multicast Manager (MM) 130. The UDs $102_1$-$102_4$ communicate with TN 110 using respective communication paths which may include network elements and communication links for transporting signaling and bearer traffic between UDs 102 and TN 110. The SS 120 and MM 130 communicate with TN 110 using communication paths which may include network elements and communication links for transporting signaling traffic between SS 120 and MM 130, respectively, and TN 110.

The UDs 102 include devices operable for participating in multicast sessions. For example, UDs 102 may include wireline phones, wireless phones, computers, and the like, as well as various combinations thereof. The UDs 102 support multicast functions enabling participation in multicast sessions. The UDs may initiate establishment of multicast groups. The UDs 102 may invite other UDs 102 to join a multicast group and UDs 102 may request permission from other UDs 102 to join a multicast group. After joining a multicast group, UDs 102 may operate as sending UDs and/or receiving UDs. The UDs 102 may support various applications requiring multicast capabilities, such as video conferencing applications, instant messaging applications, and the like, as well as various combinations thereof.

The TN 110 includes a plurality of routers $112_1$-$112_4$ (collectively, routers 112). The routers 112 may include multicast routers (i.e., routers including multicast functionality, including support for one or more multicast protocols (e.g., Protocol Independent Multicast (PIM), Internet Group Management Protocol (IGMP), and like multicast protocols, as well as various combinations thereof). The multicast functionality may include IP multicast functionality. The routers 112 communicate using a plurality of communication paths (CPs) 114 which may include network elements and communication links adapted for transporting traffic between various combinations of routers 112.

The SS 120 is a server supporting SIP signaling. The SS 120 may route SIP messages between UDs 102. For example, SS 120 may route SIP INVITE messages between UDs 102 and between UDs 102 and routers 112, thereby enabling UDs 102 to invite other UDs 102 to join a multicast group and enabling UDs 102 to request to join a multicast group. The SS 120 may route messages between UDs 102 and MM 130. The MM 130 is a system adapted for managing multicast functions. The MM 130 may perform at least a portion of the functions described herein, including establishing a multicast group according to a request to establish a multicast group received from one of UDs 102.

Although primarily depicted and described with respect to specific numbers and configurations of UDs 102, routers 112, SSs 120, and MMs 130, the present invention may be implemented using various other numbers and configurations of UDs 102, routers 112, SSs 120, and MMs 130, and, in some embodiments, other network elements adapted to perform various functions depicted and described herein. The operation of UDs 102, routers 112, SS 120, and MM 130 in support of multicast establishment and communication functions of the present invention may be better understood with respect to FIG. 2-FIG. 5.

Figure 2:
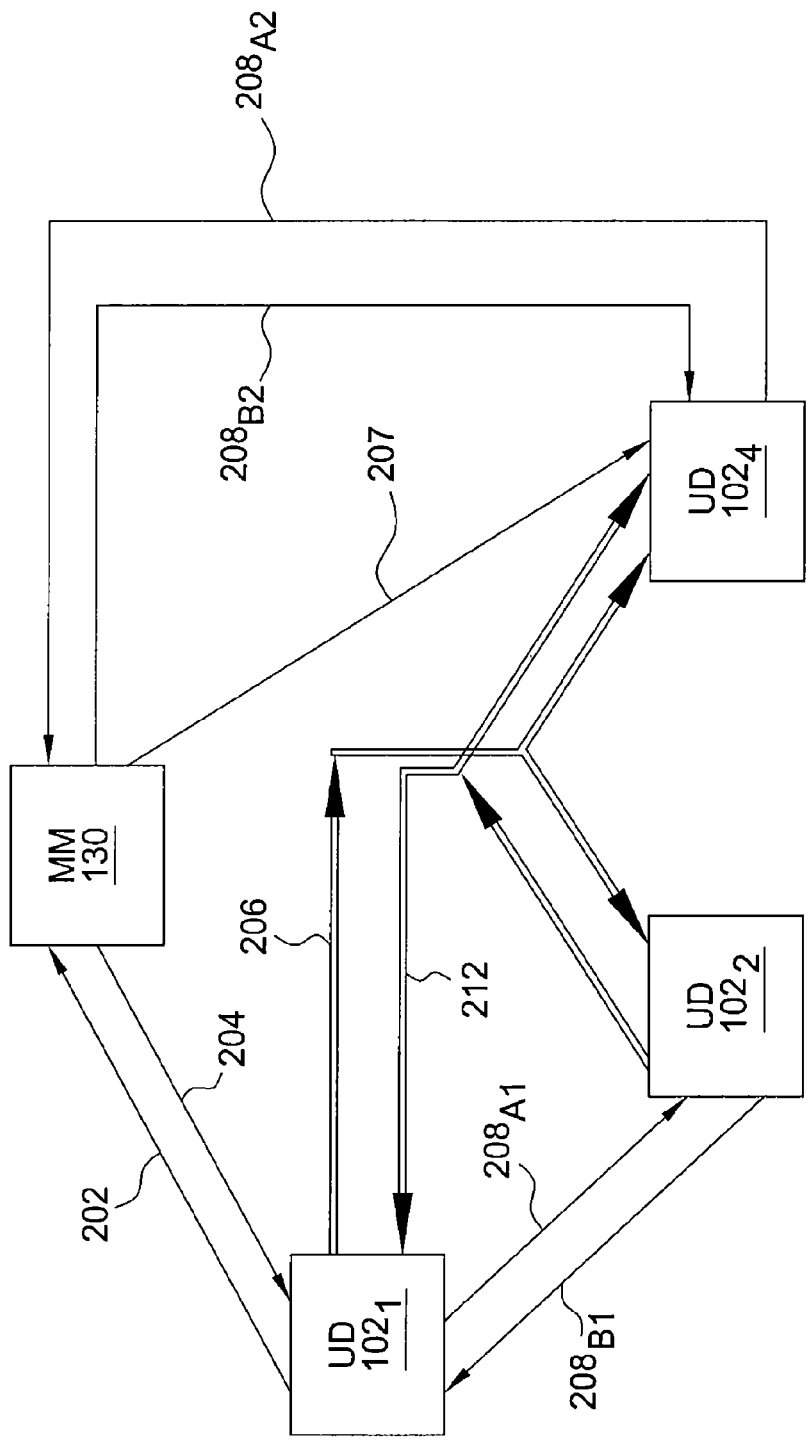
FIG. 2 depicts a high-level block diagram of a portion of the communication network of FIG. 1 including signaling according to one embodiment of the present invention.

FIG. 2 depicts a high-level block diagram of a portion of the communication network of FIG. 1 including signaling according to one embodiment of the present invention. The communication network portion 200 of FIG. 2 includes UDs $102_1$, $102_2$, and $102_4$. The communication network portion 200 of FIG. 2 further includes MM 130. For purposes of clarity in describing functions of the present invention, routers 112 and SS 120 are omitted (although, as depicted and described herein with respect to FIG. 3 and FIG. 4, routers 112 and SS 120 may support various functions of the present invention). The signaling depicted and described herein with respect to FIG. 2 is performed in order to establish a multicast group including UDs $102_1$, $102_2$, and $102_4$, and in order to support the associated multicast stream of the established multicast group.

At step 202, UD $102_1$ creates a request to establish a multicast group and forwards the request to establish the multicast group to MM 130. The UD $102_1$ forwards the request to establish the multicast group to MM 130. The UD $102_1$ may forward the request to establish the multicast group to MM 130 using one or more of a plurality of protocols and associated message formats. In one embodiment, UD $102_1$ forwards the request to establish the multicast group to MM 130, and other message and information may be exchanged, using SIP signaling. Use of SIP signaling for the present invention is depicted and described herein in more detail with respect to FIG. 3, FIG. 4, and FIG. 5.

The request to establish the multicast group includes one or more parameters. The one or more parameters included in the request to establish the multicast group include one or more parameters adapted to establish the multicast group. The one or more parameters included in the request to establish the multicast group include one or more parameters adapted to define the multicast group being established (denoted as multicast group definition parameters). The one or more parameters included in the request to establish the multicast group include one or more parameters adapted to describe the multicast session for the multicast group being established (denoted as multicast session description parameters). The one or more parameters included in the request to establish the multicast group may include various other parameters.

The multicast group definition parameters may include a time at which the multicast group is scheduled to be established, a list of network elements authorized to initiate an invitation to join the multicast group, a list of user devices authorized to join the multicast group, and the like, as well as various combinations thereof. In one embodiment, in which the multicast group definition parameters include a list of user devices authorized to join the multicast group, the multicast group definition parameters may further include one or more privileges associated with the user devices authorized to join the multicast group.

The time at which the multicast group is scheduled to be established may specify that the multicast group be established immediately or at a future date/time. The list of network elements authorized to initiate an invitation to join the multicast group may include one or more user devices (e.g., only UD $102_1$ is authorized to invite other UDs 102 to join the multicast group), one or more management systems (e.g., MM 130), and the like, as well as various combinations thereof. The list of user devices authorized to join the multicast group may include any user devices (and, in some embodiments, may alternatively be provided as a list of users authorized to join the multicast group).

In one embodiment, the list of user devices authorized to join the multicast group may include, for each user device in the list, at least one parameter (attribute) adapted for indicating whether the user device should be automatically invited to join the multicast group in response to establishment of the multicast group. The parameter may be denoted as an invite parameter. In one embodiment, the invite parameter associated with a user device may indicate that the management system which established the multicast group (illustratively, MM 130) should automatically invite the user device to join the multicast group in response to establishment of the multicast group.

In one embodiment, the list of user devices authorized to join the multicast group may include, for each user device in the list, at least one privilege parameter (attribute) defining participation by the user device in the multicast session. In one embodiment, a privilege parameter associated with each user device authorized to join a multicast group may include an indication as to whether the user device may transmit multicast traffic to other members of the multicast group (i.e., operate only as a receiving UD or as both a receiving and sending UD). Although described with respect to one specific privilege parameter, various other privilege parameters associated with individual UDs or groups of UDs may be specified in the request to establish the multicast group.

In one embodiment, the request to establish the multicast group may specify that specific devices are authorized to invite specific sets of user devices (i.e., user devices authorized to join the multicast group) to join the multicast group. For example, the request to establish the multicast group may specify that UD $102_1$ is authorized to invite UD $102_2$ (and other user devices (not depicted)) to join the multicast group and MM 130 is authorized to invite UD $102_4$ (and other user devices (not depicted)) to join the multicast group.

The multicast session description parameters may include any parameter adapted for defining the multicast session by which multicast traffic is multicasted to members of the multicast group. In one embodiment, for example, multicast session description parameters include at least one of an IP address (i.e., multicast address to be used by members of the multicast group), one or more ports (i.e., multicast ports to be used by members of the multicast group), one or more coder-decoders (codecs) (i.e., codecs to be used by members of the multicast group), and the like, as well as various combinations thereof. Although described with respect to specific multicast session description parameters, various other multicast session description parameters may be specified in the request to establish the multicast group.

In response to the request to establish the multicast group, MM 130 obtains a multicast address for the multicast group. The MM 130 may obtain the multicast address locally (e.g., from a list or range of available multicast addresses). The MM 130 assigns the multicast address to the multicast group. The MM 130 stores a mapping between the multicast group and the assigned multicast address. In one embodiment, MM 130 stores at least a portion of the parameters included in the request to establish the multicast group. The MM 130 stores the parameters included in the request to establish the multicast group in a manner for associating the stored parameters with the multicast group. In one embodiment, MM 130 stores at least a portion of the multicast group definition parameters included the request to establish the multicast group. In one embodiment, MM 130 stores at least a portion of the multicast session description parameters included in the request to establish the multicast group.

At step 204, MM 130 sends a multicast group response message to UD 102$_1$. The multicast group response message includes the multicast address assigned to the multicast group. The multicast group response message may include at least a portion of the parameters included in the request to establish the multicast group (e.g., for verification of the parameters used by MM 130 to establish the multicast group). In one such embodiment, the multicast group response message may include the multicast session description parameters accepted during establishment of the multicast group. The multicast group response message may include a multicast group identifier. At step 206, UD 102$_1$ begins transmitting multicast traffic to the multicast group using the assigned multicast address. The UD 102$_1$ begins transmitting multicast traffic using a multicast session in accordance with the multicast session description parameters.

At step 207, MM 130 initiates an invite to UD 102$_4$ to join the multicast group established by MM 130. In one embodiment, the invite to UD 102$_4$ to join the established multicast group may be initiated by MM 130 automatically in response to establishment of the multicast group. As described herein, in one embodiment, the request to establish the multicast group may include one or more parameters (denoted as an invite parameter(s)) adapted for identifying user device(s) 104 that should be automatically invited to join the multicast group in response to establishment of the multicast group.

At step 208, other user devices begin joining the multicast group dynamically requested by UD 102$_1$ and dynamically established by MM 130. There are several ways in which user devices may join the multicast group. A user device may be invited to join the multicast group (e.g., by a user device that dynamically requested establishment of the multicast group (illustratively, UD 102$_1$), by a management system associated with establishment of the multicast group (illustratively, MM 130), and the like, as well as various combinations thereof). A user device may request to join the multicast group (e.g., sending a request to a user device which dynamically requested establishment of the multicast group (illustratively, UD 102$_1$), sending a request to a management system associated with establishment of the multicast group (illustratively, MM 130), and the like, as well as various combinations thereof).

At step 208$_{A1}$, UD 102$_1$ sends an invitation to UD 102$_2$ inviting UD 102$_2$ to join the multicast group. In one embodiment, the invitation from UD 102$_1$ to UD 102$_2$ inviting UD 102$_2$ to join the multicast group may include the multicast address of the multicast group, as well as one or more multicast session description parameters required by UD 102$_2$ in order to participate in the multicast group. At step 208$_{B1}$, in response to the invitation to join the multicast group, UD 102$_2$ accepts the invitation from UD 102$_1$ to join the multicast group. The UD 102$_2$ may then begin receiving multicast traffic over the multicast address of the multicast group. Although omitted for purposes of clarity, in one embodiment, UD 102$_2$ (or other UDs 102) may initiate a request to UD 102$_1$ to be joined to the multicast group.

At step 208$_{A2}$, UD 1024 initiates a request to MM 130 requesting to join the multicast group. At step 208$_{B2}$, in response to the request to join the multicast group, MM 130 accepts the request from UD 102$_4$ to join the multicast group. In one embodiment, the acceptance by MM 130 of the request by UD 102$_4$ to join the multicast group may include the multicast address of the multicast group, as well as one or more multicast session description parameters required by UD 102$_4$ in order to participate in the multicast group. The UD 102$_4$ may then begin receiving multicast traffic over the multicast address of the multicast group. Although omitted for purposes of clarity, in one embodiment, MM 130 may initiate a request to UD 102$_4$ (or other UDs 102) inviting UD 102$_4$ to join the multicast group.

Although described with respect to specific methods by which user devices join a multicast group, user devices may join a multicast group using various other methods. In one example, although omitted for purposes of clarity, a user device may join a multicast group through a router using standard multicast join capabilities. In another example, a user device may be joined to a multicast group by a management system (illustratively, MM 130) through communication between the manager and the router. These and other methods by which user devices may join an established multicast group may be better understood with respect to FIG. 3 and FIG. 4 depicted and described herein.

Upon joining the multicast group, at step 210, UD 102$_2$ begins receiving multicast traffic from UD 102$_1$ over the multicast address of the multicast group. Upon joining the multicast group, at step 212, UD 102$_2$ begins transmitting multicast traffic to UD 102$_1$ and 102$_4$ over the multicast group. Upon joining the multicast group, at step 210, UD 102$_4$ begins receiving multicast traffic from UD 102$_1$ over the multicast address of the multicast group. Upon joining the multicast group, at step 212, UD 102$_4$ begins receiving multicast traffic from UD 102$_2$ over the multicast address of the multicast group. Although omitted for purposes of clarity, UDs 102$_2$ and 102$_4$ may leave the multicast group using any means of leaving the multicast group.

Figure 3:
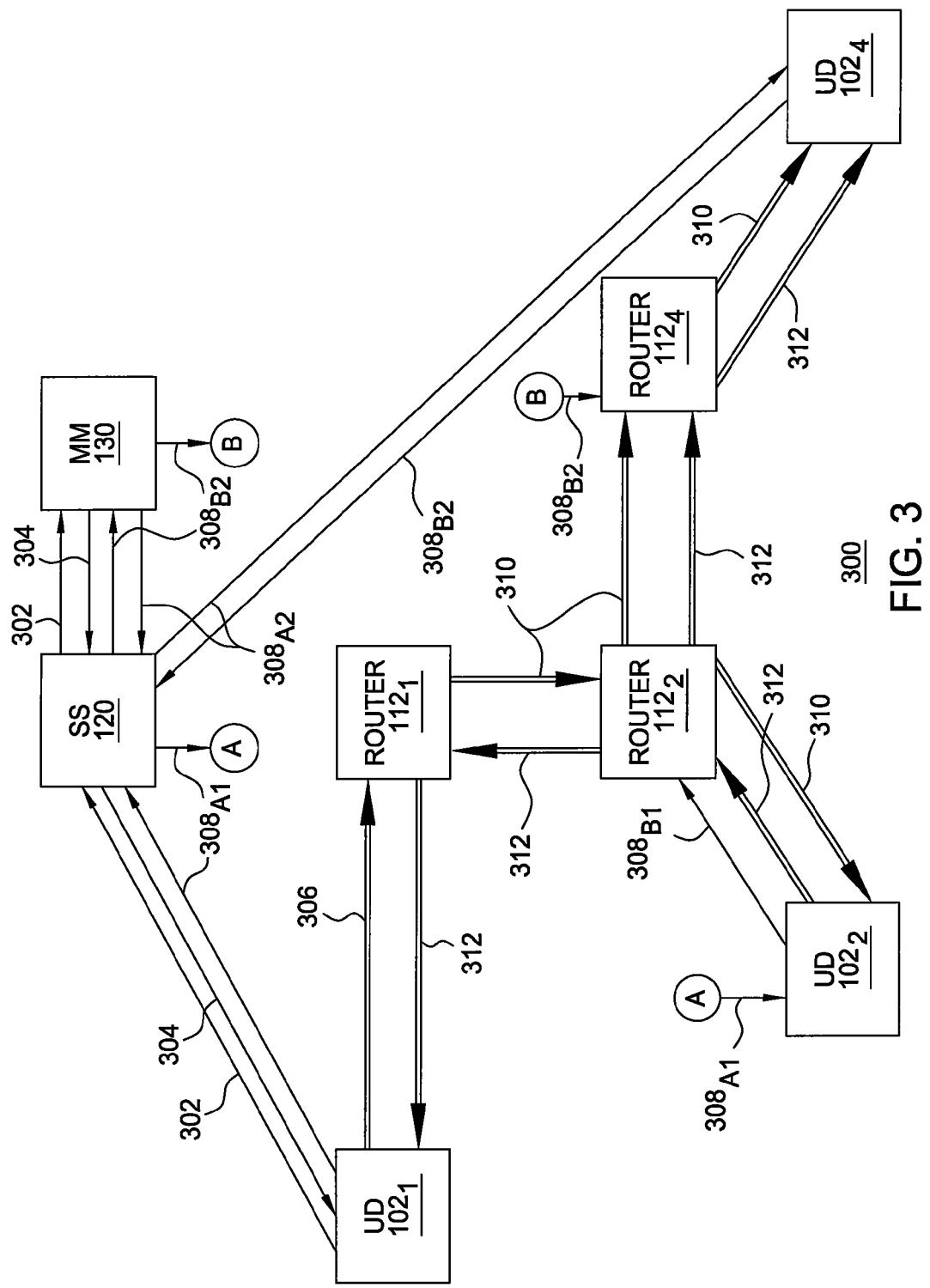
FIG. 3 depicts a high-level block diagram of a portion of the communication network of FIG. 1 including signaling according to one embodiment of the present invention.
Figure 4:
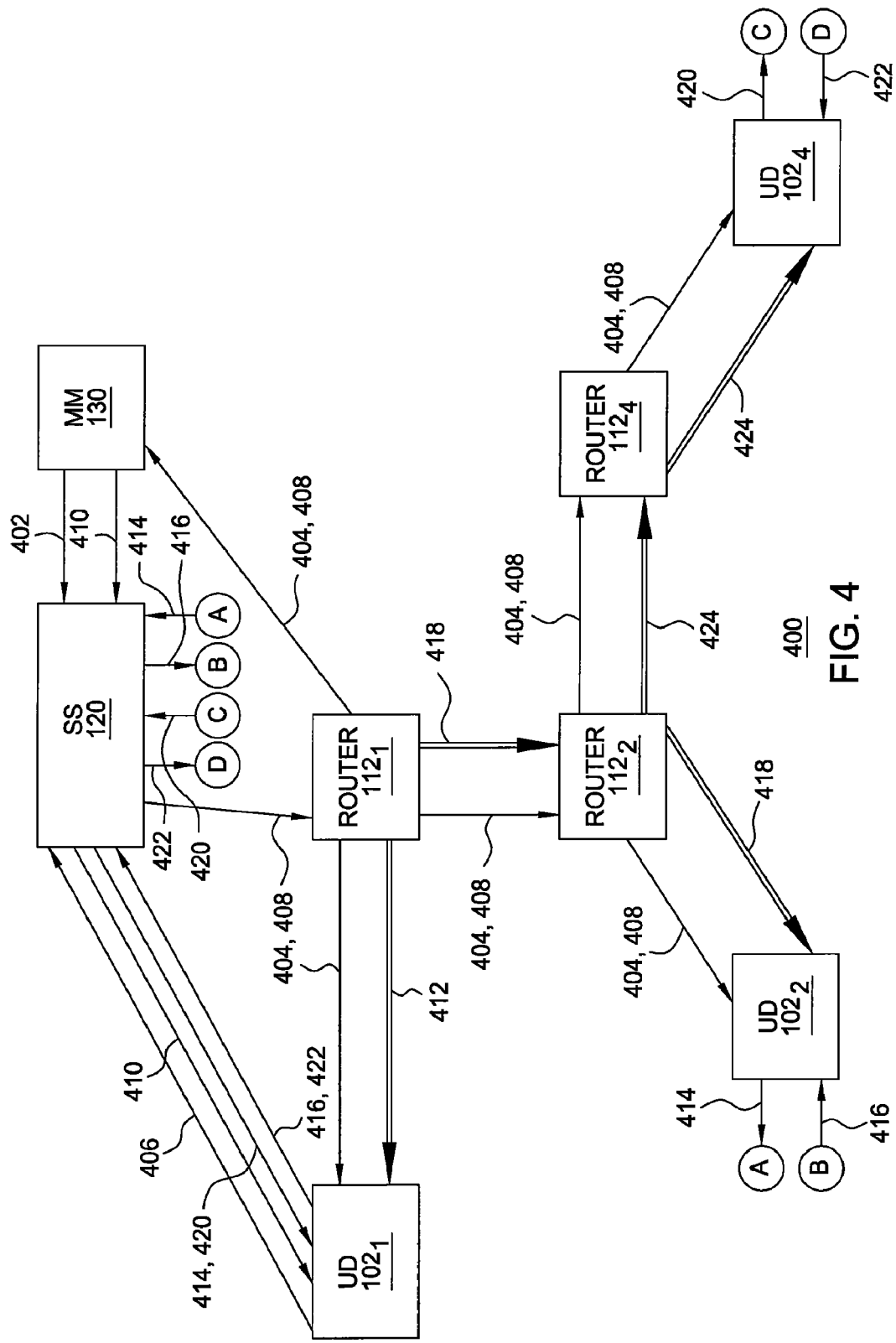
FIG. 4 depicts a high-level block diagram of a portion of the communication network of FIG. 1 including signaling according to one embodiment of the present invention.

FIG. 3 depicts a high-level block diagram of a portion of the communication network of FIG. 1 including signaling according to one embodiment of the present invention. The communication network portion 200 of FIG. 2 includes UDs 102$_1$, 102$_2$, and 102$_4$, and routers 112$_1$, 112$_2$, and 112$_4$. The communication network portion 300 of FIG. 3 further includes SS 120 and MM 130. The signaling depicted and described herein with respect to FIG. 3 is performed in order to establish a multicast group including UDs 102$_1$, 102$_2$, and 102$_4$, and in order to support the associated multicast stream of the established multicast group.

At step 302, UD 102$_1$ initiates a request to establish a multicast group. The request to establish the multicast group is similar to the request to establish the multicast group described with respect to FIG. 2 (i.e., the request to establish the multicast group may include various parameters adapted to establish the multicast group, including multicast group definition parameters, multicast session description parameters, and like parameters, as well as various combinations thereof).

As described herein, in one embodiment, the request to establish the multicast group may include a time at which the multicast group is scheduled to be established. If the multicast group is scheduled to be established immediately, MM 130 immediately establishes the multicast group (e.g., by assigning a multicast address to the multicast group and storing at least a portion of the parameters included in the request to establish the multicast group). If the multicast group is scheduled to be established at a later time, MM 130 stores the information received with the request to establish the multicast group for use in establishing the multicast group at the scheduled time. For purposes of clarity in describing the invention, assume that the request to establish the multicast group initiated by UD 102$_1$ indicates that the multicast group is scheduled to be established immediately.

The UD $102_1$ forwards the request to establish the multicast group to SS 120. The SS 120 forwards the request to establish the multicast group to MM 130. In one embodiment, the request to establish the multicast group is conveyed using a SIP INVITE message. In one embodiment, at least a portion of the parameters included in the request to establish the multicast group may be conveyed using one or more existing SIP fields, including SIP header fields and SIP body fields. In one embodiment, for example, at least a portion of the multicast session description parameters may be conveyed using the SIP session description field. In one embodiment, at least a portion of the parameters included in the request to establish the multicast group may be conveyed using new SIP fields, including new SIP header fields and new SIP body fields. In one embodiment, MM 130 may be implemented as a SIP application server.

The MM 130 establishes the multicast group in response to the request to establish the multicast group. The MM 130 establishes the multicast group in a manner similar to establishment of the multicast group as described herein with respect to FIG. 2. The MM 130 assigns the multicast address to the multicast group. The MM 130 stores at least a portion of the parameters (e.g., multicast group definition parameters and multicast session description parameters) included in the request to establish the multicast group. The MM 130 stores the multicast address and the parameters included in the request to establish the multicast group in a manner for associating the multicast address and the parameters with the multicast group.

At step 304, MM 130 initiates a response to the request to establish the multicast group. The MM 130 forwards the response to SS 120. The SS 120 forwards the response to UD $102_1$. The response includes the multicast address assigned for the multicast group. The response includes the multicast session description parameters associated with the multicast session for the multicast group. In one embodiment, the multicast session description parameters returned in the response are identical to the multicast session description parameters included in the request to establish the multicast group. The response to the request to establish the multicast group may be conveyed using a SIP OK message.

In one embodiment, in which at least a portion of the multicast session description parameters included in the request to establish the multicast session are not accepted by MM 130, the response may include multicast session description parameters accepted by MM 130 (a portion of which may be different than the requested multicast session description parameters). This response may be conveyed using a SIP OK message. In one embodiment, in which at least a portion of the multicast session description parameters included in the request to establish the multicast session are not accepted by MM 130, the response may be a negative response (e.g., a SIP 486 BUSY message).

At step 306, UD $102_1$ begins transmitting multicast traffic to the multicast group. The UD $102_1$ begins transmitting multicast traffic using the assigned multicast address. The UD $102_1$ begins transmitting multicast traffic using a multicast session in accordance with the accepted multicast session description parameters (returned from MM 130 to UD $102_1$ in the response to the request to establish the multicast group). As depicted in FIG. 3, UD $102_1$ transmits multicast traffic to router $112_1$, from which the multicast traffic may be transmitted to other UDs 102 which join the multicast group, as well as to other routers 112 supporting UDs 102 which join the multicast group. Although depicted as beginning prior to other UDs 102 joining the multicast group, in other embodiments, transmission of multicast traffic by UD $102_1$ to the multicast group may occur before, contemporaneous with, or after one or more other UDs 102 begin joining the multicast group.

At step 308, other user devices begin joining the multicast group dynamically requested by UD $102_1$ and dynamically established by MM 130. There are several ways in which user devices may join the multicast group. A user device may be invited to join the multicast group (e.g., by a user device which dynamically requested establishment of the multicast group (illustratively, UD $102_1$), by a management system associated with establishment of the multicast group (illustratively, MM 130), and the like, as well as various combinations thereof). There are several ways in which a user device may respond to an invitation to join the multicast group.

In one embodiment, a user device may respond to an invitation to join the multicast group using standard multicast join mechanisms of existing multicast protocols (e.g., sending a join message to a router associated with the user device, such as an Internet Group Management Protocol (IGMP) join message, a Multicast Listener Discover (MLD) message, and the like). Although omitted for purposes of clarity, MM 130 is expected to be aware of such joins to (as well as leaves from) the multicast group through routers 112. The MM 130 may be made aware of such joins/leaves using periodic polling from MM 130 to routers 112, explicit signaling from routers 112 to MM 130, and the like, as well as various combinations thereof.

In one embodiment, in which the invitation to join the multicast group is sent using a SIP request message (e.g., SIP INVITE message), a user device may respond to an invitation to join the multicast group with a SIP response message (e.g., SIP OK). In this embodiment, the device which receives the SIP OK message may notify the appropriate router(s) that the user device is joining the multicast group. For example, if the SIP INVITE message originated from one of the UDs 102, that UD 102 may receive the SIP OK message and, in response to the SIP OK message, directly or indirectly (e.g., via SS 120 and/or MM 130) inform the appropriate router that the UD 102 is joining the multicast group. For example, if the SIP INVITE message originated from MM 130, MM 130 may receive the SIP OK message and, in response to the SIP OK message, inform the appropriate router that the UD 102 is joining the multicast group.

At step $308_{A1}$, UD $102_1$ sends a SIP INVITE message to UD $102_2$ inviting UD $102_2$ to join the multicast group. The UD $102_1$ sends the SIP INVITE message to SS 120 which forwards the SIP INVITE message to UD $102_2$. In one embodiment, the invitation from UD $102_1$ to UD $102_2$ inviting UD $102_2$ to join the multicast group may include the multicast address of the multicast group, as well as one or more multicast session description parameters required by UD $102_2$ in order to participate in the multicast group. At step $308_{B1}$, in response to the SIP INVITE message inviting UD $102_2$ to join the multicast group, UD $102_2$ accepts the invitation from UD $102_1$ to join the multicast group by initiating a standard multicast join to router $112_2$ (e.g., using IGMP, MLD, and like protocols).

At step $308_{A2}$, MM 130 sends a SIP INVITE message to UD $102_4$ inviting UD $102_2$ to join the multicast group. The MM 130 sends the SIP INVITE message to SS 120 which forwards the SIP INVITE message to UD $102_4$. In one embodiment, the invitation from MM 130 to UD $102_4$ inviting UD $102_4$ to join the multicast group may include the multicast address of the multicast group, as well as one or more multicast session description parameters required by UD $102_4$ in order to participate in the multicast group. At step $308_{B2}$, in response to the SIP INVITE message inviting UD $102_4$ to join the multicast group, UD $102_4$ accepts the invitation from MM 130 to join the multicast group by initiating a SIP OK message in response to the SIP INVITE message. The UD $102_4$ sends the SIP OK message to SS 120. The SS 120 forwards the SIP OK message to MM 130. In response to the SIP OK message, MM 130 notifies router $112_4$ that UD $102_4$ is joining the multicast group.

At step 310, upon joining the multicast group, UDs $102_2$ and $102_4$ begin receiving multicast traffic from UD $102_1$ over the multicast address of the multicast group. The UD $102_2$ receives multicast traffic from UD $102_1$ via routers $112_1$ and $112_2$. The UD $102_4$ receives multicast traffic from UD $102_1$ via routers $112_1$, $112_2$, and $112_4$. At step 312, upon joining the multicast group, UD $102_2$ begins transmitting multicast traffic to UDs $102_1$ and $102_4$ over the multicast group. The UD $102_1$ receives multicast traffic from UD $102_2$ via routers $112_1$ and $112_2$. The UD $102_4$ receives multicast traffic from UD $102_2$ via routers $112_2$ and $112_4$. Although omitted for purposes of clarity, UDs $102_2$ and $102_4$ may leave the multicast group using any means of leaving the multicast group, such as using standard multicast leaves (e.g., IGMP/MLD leaves), initiating SIP BYE messages to the device(s) which invited the UD 102 to join the multicast group (e.g., UD 102, or MM 130), and the like.

Although omitted for purposes of clarity, rather than being invited to join the multicast group, a user device may request to join the multicast group (e.g., sending a request to a user device which dynamically requested establishment of the multicast group (illustratively, UD $102_1$), sending a request to a management system associated with establishment of the multicast group (illustratively, MM 130), and the like, as well as various combinations thereof). In one embodiment, a request by a user device to join the multicast group may be conveyed using one or more SIP messages (e.g., SIP INVITE messages). In one embodiment, MM 130 may periodically forward a current list of multicast group members to various combinations of non-member user devices which may be used by the non-member user devices as a basis for determining whether to request to join the multicast group (e.g., using SIP INVITE messages, SIP re-INVITE messages, and the like, as well as various combinations thereof).

In one embodiment, in which a user device initiates a request to join the multicast group to a user device which dynamically requested establishment of the multicast group, the user device to which the request is initiated may respond directly to the user device which initiates the request or, alternatively, may forward the request to the management system associated with establishment of the multicast group. If the user device to which the request is initiated responds directly, the direct response may include the multicast address and associated multicast session description parameters of the multicast session. The direct response may be conveyed using one or more SIP messages (e.g., SIP INVITE, SIP OK, and the like, as well as various combinations thereof).

If the request is forwarded to the management system associated with establishment of the multicast group, the management system (illustratively, MM 130) may respond to the request directly, or, alternatively, may instruct one or more routers associated with the joining user device that the user device is joining the multicast group. If the MM 130 responds to the request directly, the direct response may include the multicast address and associated multicast session description parameters of the multicast session. The direct response may be conveyed using one or more SIP messages (e.g., SIP INVITE, SIP OK, and the like, as well as various combinations thereof). The MM 130 may alternatively instruct one or more routers associated with the joining user device that the user device is joining the multicast group (which may be performed in a manner as described with respect to steps $308_{B2}$).

FIG. 4 depicts a high-level block diagram of a portion of the communication network of FIG. 1 including signaling according to one embodiment of the present invention. The communication network portion 400 of FIG. 4 includes UDs $102_1$, $102_2$, and $102_4$, and associated routers $112_1$, $112_2$, and $112_4$. The communication network portion 400 of FIG. 4 further includes SS 120 and MM 130. The signaling depicted and described herein with respect to FIG. 4 is performed in order to establish a multicast group including UDs $102_1$, $102_2$, and $102_4$, and in order to support the associated multicast stream of the established multicast group.

At step 402, MM 130 registers with SS 120 using a SIP REGISTER message. The MM 130 registers using a predefined multicast signaling address known by a number of UDs 102 (e.g., each of UDs 102 depicted with respect to FIG. 1). The MM 130 may manage one or more multicast signaling groups and each multicast signaling group may include one or more multicast signaling addresses. A multicast signaling group including multiple multicast signaling addresses enables further grouping of UDs 102 included within the multicast signaling group, thereby enabling reductions in the number of signaling messages received by specific UDs 102.

For example, UDs $102_1$-$102_4$ may belong to a multicast signaling group and, within the multicast signaling group, UDs $102_1$ and $102_2$ and UDs $102_3$ and $102_4$ may use different multicast signaling addresses. In this example, signaling may be directed to both UDs $102_1$ and $102_2$ without being directed to UDs $102_3$ and $102_4$ and, similarly, signaling may be directed to UDs $102_3$ and $102_4$ without being directed to UDs $102_1$ and $102_2$. In one embodiment, multicast signaling addresses may be hierarchically structured, thereby enabling MM 130 to determine multicast signaling of leaf addresses using the associated root address.

At step 404, a SIP OK message is multicasted to UDs 102 that have joined the multicast signaling group (potentially all user devices in the network). For purposes of clarity, an assumption is made that UDs $102_1$, $102_2$, and $102_4$ have joined the multicast signaling group (and UD $102_3$ has not joined the multicast signaling group). In accordance with this assumption, SS 120 multicasts the SIP OK message to UDs $102_1$ (via router $112_1$), $102_2$ (via routers $112_1$ and $112_2$), and $102_4$ (via routers $112_1$, $112_2$, and $112_4$). The signaling associated with steps 402 and 404 may be performed at any time prior to requests to establish multicast groups.

At step 406, UD $102_1$ creates a request to establish a multicast group and forwards the request to establish the multicast group to MM 130. The UD $102_1$ conveys the request to establish the multicast group as a SIP INVITE message, transmitting the SIP INVITE message to SS 120, which forwards the SIP INVITE message to MM 130. In one embodiment, the request to establish the multicast group is substantially similar to the request to establish the multicast group depicted and described herein with respect to steps 202 and 302 of FIG. 2 and FIG. 3, respectively. In order to support establishment of multicast groups in which the multicast group is scheduled to be established at a future time, MM 130 may operate as a SIP application server (i.e., caching the request to establish the multicast group until the scheduled multicast group establishment time).

At step 408, the SIP INVITE message (i.e., the request to establish the multicast group) is multicasted by SS 120 to all devices that listen to SIP signaling on the multicast signaling address specified by MM 130 (i.e., to all devices which have joined the multicast signaling group). The SS 120 multicasts the SIP INVITE message to UDs $102_1$, $102_2$, and $102_4$ which have joined the multicast signaling group and MM 130 which formed the multicast signaling group. The SS 120 multicasts the SIP INVITE message to UDs $102_1$ (via router $112_1$), $102_2$ (via routers $112_1$ and $112_2$), and $102_4$ (via routers $112_1$, $112_2$, and $112_4$), and MM 130 (via router $112_1$).

As described herein, in one embodiment, the request to establish the multicast group may include a time at which the multicast group is scheduled to be established. If the multicast group is scheduled to be established immediately, MM 130 immediately establishes the multicast group (e.g., by assigning a multicast address to the multicast group and storing at least a portion of the parameters included in the request to establish the multicast group). If the multicast group is scheduled to be established at a later time, MM 130 stores the information received with the request to establish the multicast group for use in establishing the multicast group at the scheduled time. For purposes of clarity in describing the invention, assume that the request to establish the multicast group initiated by UD $102_1$ indicates that the multicast group is scheduled to be established immediately.

The MM 130 establishes the multicast group in response to the request to establish the multicast group. The MM 130 establishes the multicast group in a manner similar to establishment of the multicast group as described herein with respect to FIG. 2 and FIG. 3. The MM 130 assigns the multicast address to the multicast group. The MM 130 stores at least a portion of the parameters (e.g., multicast group definition parameters and multicast session description parameters) included in the request to establish the multicast group. The MM 130 stores the multicast address and the parameters included in the request to establish the multicast group in a manner for associating the multicast address and the parameters with the multicast group.

At step 410, MM 130 initiates a SIP OK message in response to the request to establish the multicast group. The MM 130 forwards the SIP OK message to SS 120 which forwards the SIP OK message to UD $102_1$. The SIP OK response message from MM 130 to UD $102_1$ is not multicast by SS 120 using the multicast signaling group used to multicast the SIP INVITE message (i.e., the request to establish the multicast group). The response includes the multicast session description parameters associated with the multicast session for the multicast group, including the multicast address assigned to the multicast group. In one embodiment, the multicast session description parameters returned in the SIP OK message are identical to the multicast session description parameters included in the SIP INVITE message. In one embodiment, in which at least a portion of the multicast session description parameters included in the request to establish the multicast session are not accepted by MM 130, the response may include multicast session description parameters accepted by MM 130.

At step 412, UD $102_1$ begins transmitting multicast traffic to the multicast group. The UD $102_1$ begins transmitting multicast traffic using the assigned multicast address. The UD $102_1$ begins transmitting multicast traffic using a multicast session in accordance with the accepted multicast session description parameters (returned from MM 130 to UD $102_1$ in the response to the request to establish the multicast group). As depicted in FIG. 4, UD $102_1$ transmits multicast traffic to router $112_1$, from which the multicast traffic may be transmitted to other UDs 102 which join the multicast group, as well as to other routers 112 supporting UDs 102 which join the multicast group. Although depicted as beginning prior to other UDs 102 joining the multicast group, in other embodiments, transmission of multicast traffic by UD $102_1$ to the multicast group may occur before, contemporaneous with, or after one or more other UDs 102 begin joining the multicast group.

At step 414, UD $102_2$ responds to the SIP INVITE message (i.e., the request to establish the multicast group) with a SIP OK message. The UD $102_2$ transmits the SIP OK message to SS 120, which forwards the SIP OK message to UD $102_1$. Since the SIP INVITE message multicast by SS 120 includes the multicast session description parameters, UD $102_2$ receives the multicast session description parameters required to participate in the multicast session as part of the SIP INVITE message multicast by SS 120. The UD $102_2$, however, does not yet have the multicast address required to join the multicast group and participate in the multicast session.

At step 416, UD $102_1$ responds to the SIP OK message with a SIP ACK message. The UD $102_1$ transmits the SIP ACK message to SS 120, which forwards the SIP ACK message to UD $102_2$. The SIP ACK message from UD $102_1$ includes the multicast address assigned by MM 130 and provided by MM 130 to UD $102_1$ (in the SIP OK message of step 410). Although omitted for purposes of clarity, after receiving the multicast address from UD $102_1$, UD $102_2$ may join the multicast group in one of several ways. In one embodiment, UD $102_2$ may join the multicast group using one of the several methods depicted and described herein with respect to FIG. 3. At step 418, upon joining the multicast group, UD $102_2$ begins receiving multicast traffic from UD $102_1$ over the multicast address of the multicast group. The UD $102_2$ receives multicast traffic from UD $102_1$ via routers $112_1$ and $112_2$.

At step 420, at some later time (e.g., later than the time at which UD $102_2$ responds to the SIP INVITE message), UD $102_4$ responds to the SIP INVITE message (i.e., the request to establish the multicast group) with a SIP OK message. The UD $102_4$ transmits the SIP OK message to SS 120, which forwards the SIP OK message to UD $102_1$. Since the SIP INVITE message multicast by SS 120 includes the multicast session description parameters, UD $102_4$ receives the multicast session description parameters required to participate in the multicast session as part of the SIP INVITE message multicast by SS 120. The UD $102_4$, however, does not yet have the multicast address required to join the multicast group and participate in the multicast session.

At step 422, UD $102_1$ responds to the SIP OK message with a SIP ACK message. The UD $102_1$ transmits the SIP ACK message to SS 120, which forwards the SIP ACK message to UD $102_4$. The SIP ACK message from UD $102_1$ includes the multicast address assigned by MM 130 and provided by MM 130 to UD $102_1$ (in the SIP OK message of step 410). Although omitted for purposes of clarity, after receiving the multicast address from UD $102_1$, UD $102_4$ may join the multicast group in one of several ways. In one embodiment, UD $102_4$ may join the multicast group using one of the several methods depicted and described herein with respect to FIG. 3. At step 424, upon joining the multicast group, UD $102_4$ begins receiving multicast traffic from UD $102_1$ over the multicast address of the multicast group. The UD $102_4$ receives multicast traffic from UD $102$, via routers $112_1$, $112_2$, and $112_4$.

Although omitted for purposes of clarity, UDs $102_2$ and $102_4$ may leave the multicast group using any means of leaving the multicast group, such as using standard multicast leaves (e.g., IGMP/MLD leaves), initiating SIP BYE messages UD $102_1$. The MM 130 will not receive such SIP BYE messages from UDs $102_2$ and $102_4$ unless MM 130 is in the signaling path (e.g., unless MM 130 is implemented as a SIP application server). Although omitted for purposes of clarity, the multicast session may be closed by UD $102_1$ (e.g., by sending a SIP BYE message to all UDs 102 which joined the multicast signaling group established by MM 130). The SIP BYE message is multicasted to all UDs 102 which joined the multicast signaling group using the multicast signaling group.

In one embodiment, in which MM 130 is a SIP application server, the SIP OK message initiated by UD $102_1$ (in step 404) and multicast to UDs 102 that have joined the multicast signaling group may be suppressed. In this embodiment, the SIP OK message would be received by MM 130, however, MM 130 would be able to suppress the multicasting of the SIP OK message to UDs $102_1$, $102_2$, and $102_4$.

In one embodiment, in which MM 130 is a SIP application server, the SIP INVITE message (i.e., the request to establish the multicast group multicast by SS 120 to all devices that listen to SIP signaling on the multicast signaling address) may be modified, before the SIP INVITE message is multicasted by SS 120 to all devices that listen to SIP signaling on the multicast signaling address, by MM 130 to include the multicast address assigned by MM 130.

In one embodiment, in which MM 130 is a SIP application server, since MM 130 receives all SIP signaling, MM 130 could set up the multicast paths in the routers in response to SIP OK message received from UDs 102 attempting to join the multicast group, thereby obviating the need for specific multicast joins by each of the UDs 102 (as well as obviating the need for each UD 102 to support an associated multicast stack).

Although omitted from FIGS. 2-4 for purposes of clarity, in one embodiment, the multicast session may be periodically re-announced (e.g., using a SIP RE-INVITE message which may be multicast to various combinations of UDs 102 using one or more multicast signaling groups established as described herein). Although omitted for purposes of clarity, in one embodiment, after the multicast session is established, the multicast session may be altered. The multicast session may be altered by a UD 102 which requested establishment of the multicast group (illustratively, UD $102_1$) or by one or more other UDs 102 which join the multicast group and participate in the multicast session (illustratively, UDs $102_2$ and $102_4$).

The multicast session may be altered such that one or more of the parameters specified in the request to establish the multicast group (or one or more parameters altered in a previous request to alter the multicast session) may be altered. In one embodiment, at least a portion of the multicast group definition parameters may be altered (e.g., to change the list of UDs authorized to join the multicast group, to change permissions associated with one or more UDs authorized to join the multicast group, and the like, as well as various combinations thereof). In one embodiment, at least a portion of the multicast session description parameters may be altered (e.g., to change the ports used in the multicast session, to change the codec used in the multicast session, and the like, as well as various combinations thereof).

In one embodiment, the multicast session may be altered by initiating a SIP RE-INVITE message to MM 130. In one embodiment, the SIP RE-INVITE message may be multicast within the multicast group (i.e., so that only UDs 102 participating in the multicast session receive the SIP RE-INVITE message). For example, the SIP RE-INVITE message may be multicast to UDs $102_2$ and $102_4$. In one embodiment, the SIP RE-INVITE message may be multicast using a multicast signaling group (i.e., so that UDs 102 other than UDs 102 participating in the multicast session receive the SIP RE-INVITE message). For example, the SIP RE-INVITE message may be multicast to UDs $102_1$, $102_2$, $102_3$, and $102_4$.

Although primarily depicted and described herein with respect to user devices, in some embodiments, since end users may access communication networks from multiple user devices associated with one or more network access points, references herein to user device may alternatively refer to a specific user irrespective of the user device by which that user accesses communication networks. In such embodiments, user device may refer to the end user associated with the user device. For example, although primarily described herein with respect to privilege parameters associated with each user device authorized to join a multicast group, privilege parameters may in fact be associated with the respective users associated with the user devices.

Although primarily depicted and described herein with respect to an embodiment in which Any Source Multicast (ASM) is used, the present invention may be implemented in embodiments in which Source Specific Multicast (SSM) is used. For example, although primarily depicted and described herein with respect to multicast streams originating from multiple UDs 102, in one embodiment, only one of the UDs 102 may have permission to transmit to other members of the multicast group. Although primarily depicted and described herein with respect to embodiments in which SIP signaling is used to establish and manage multicast groups, in other embodiments, various other protocols may be used to establish and maintain multicast groups. In one such embodiment, for example, HTTP may be used to establish and maintain multicast groups.

Figure 5:
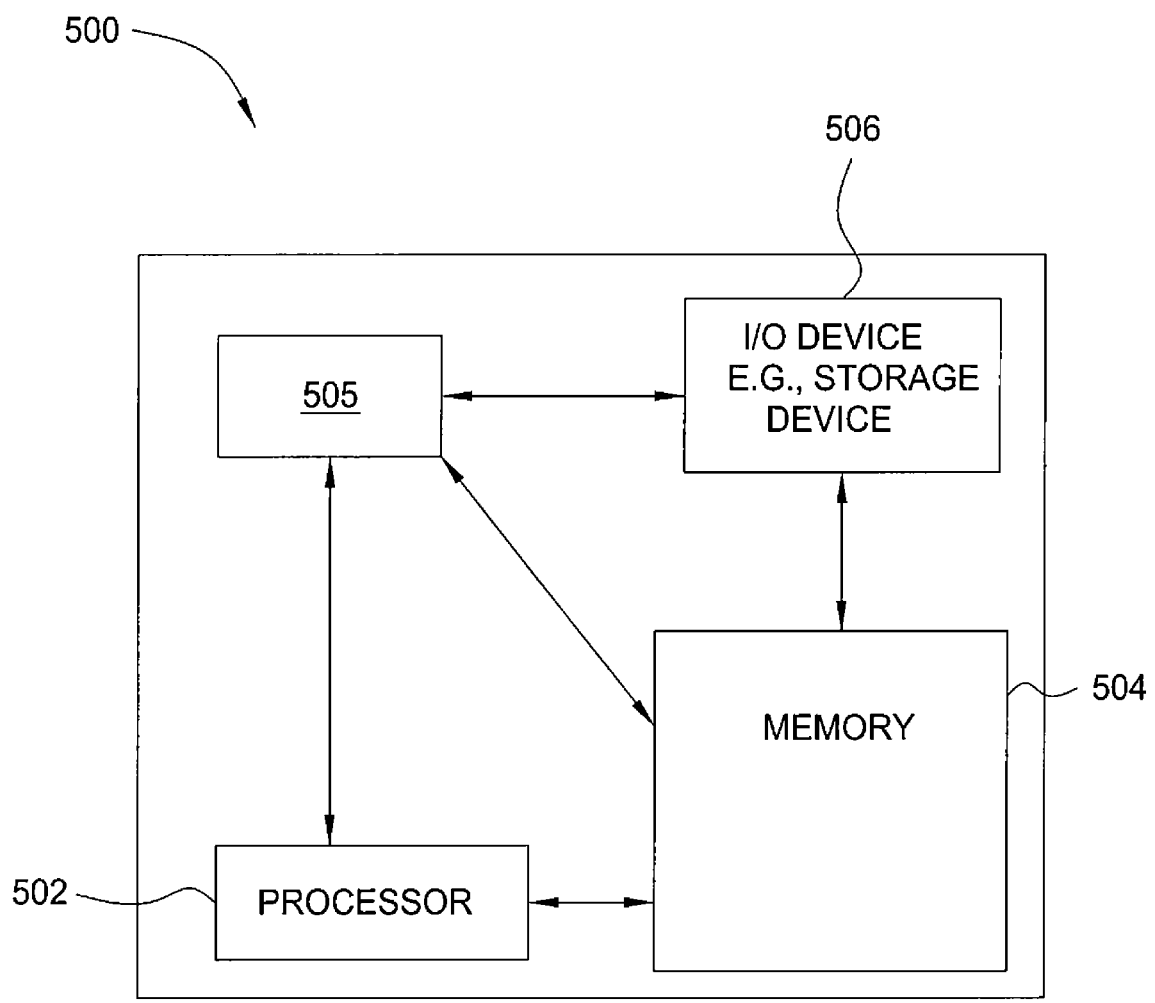
FIG. 5 depicts a high-level block diagram of a general-purpose computer suitable for use in performing at least a portion of the functions described herein.

FIG. 5 depicts a high-level block diagram of a general-purpose computer suitable for use in performing the functions described herein. As depicted in FIG. 5, system 500 includes a processor element 502 (e.g., a CPU), a memory 504, e.g., random access memory (RAM) and/or read only memory (ROM), a multicast group establishment/management module 505, and various input/output devices 506 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present multicast group establishment/management module or process 505 can be loaded into memory 504 and executed by processor 502 to implement the functions as discussed above. As such, multicast group establishment/management process 505 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method, comprising:
propagating, from a first user device toward a network device, a request to establish a multicast group, wherein the request comprises a plurality of parameters requested for the multicast group;
receiving, at the first user device, a multicast group response message indicative that the multicast group has been created in response to the request for the multicast group, wherein the multicast group response message comprises a multicast address assigned for the multicast group and at least one parameter accepted for the multicast group; and propagating, from the first user device toward a second user device, an invitation to join the multicast group, wherein the invitation to join the multicast group comprises the multicast address and the at least one accepted parameter for use by the second user device to dynamically join the multicast group.

2. The method of claim 1, wherein the parameters requested for the multicast group comprise at least one multicast group definition parameter and at least one multicast session description parameter.

3. The method of claim 2, wherein the at least one multicast group definition parameter comprises at least one of a time at which the multicast group is scheduled to be established, a list of network elements authorized to initiate an invitation to join the multicast group, and a list of user devices authorized to join the multicast group.

4. The method of claim 3, wherein the list of user devices authorized to join the multicast group comprises, for each user device in the list, at least one of an invite parameter adapted for indicating whether the user device is automatically invited to join the multicast group in response to establishment of the multicast group, and at least one privilege parameter defining participation by the user device in the multicast session.

5. The method of claim 2, wherein the at least one multicast session description parameter comprises at least one of an Internet Protocol (IP) address, a port, and a codec.

6. The method of claim 1, wherein the at least one parameter accepted for the multicast group comprises at least one multicast session description parameter.

7. The method of claim 1, further comprising:
transmitting multicast traffic from the first user device using the multicast group.

8. The method of claim 1, wherein the first user device propagates the invitation toward the second user device in response to a request from the second user device to join the multicast group.

9. The method of claim 1, further comprising:
propagating the multicast address and the at least one accepted parameter of the multicast group toward a third user device by one of:
an invitation to join the multicast group propagated from the first user device toward the third user device automatically in response to receiving the multicast group response message; or
a response message propagated from the first user device toward the third user device in response to receiving a request for the third user device to join the multicast group.

10. The method of claim 1, wherein the invitation is propagated from the first user device toward the second user device using a signaling multicast group.

11. An apparatus, comprising:
a processor; and
a memory storing instructions which, when executed by the processor, cause the processor to perform steps of:

propagating, from a first user device toward a network device, a request to establish a multicast group, wherein the request comprises a plurality of parameters requested for the multicast group;

receiving, at the first user device, a multicast group response message indicative that the multicast group has been created in response to the request for the multicast group, wherein the multicast group response message comprises a multicast address assigned for the multicast group and at least one parameter accepted for the multicast group; and propagating, from the first user device toward a second user device, an invitation to join the multicast group, wherein the invitation to join the multicast group comprises the multicast address and the at least one accepted parameter for use by the second user device to dynamically join the multicast group.

12. The apparatus of claim 11, wherein the parameters requested for the multicast group comprise at least one multicast group definition parameter and at least one multicast session description parameter.

13. The apparatus of claim 12, wherein the at least one multicast group definition parameter comprises at least one of a time at which the multicast group is scheduled to be established, a list of network elements authorized to initiate an invitation to join the multicast group, and a list of user devices authorized to join the multicast group.

14. The apparatus of claim 13, wherein the list of user devices authorized to join the multicast group comprises, for each user device in the list, at least one of an invite parameter adapted for indicating whether the user device is automatically invited to join the multicast group in response to establishment of the multicast group, and at least one privilege parameter defining participation by the user device in the multicast session.

15. The apparatus of claim 12, wherein the at least one multicast session description parameter comprises at least one of an Internet Protocol (IP) address, a port, and a codec.

16. The apparatus of claim 11, wherein the at least one parameter accepted for the multicast group comprises at least one multicast session description parameter.

17. The apparatus of claim 11, wherein the first user device propagates the invitation toward the second user device in response to a request from the second user device to join the multicast group.

18. The apparatus of claim 11, wherein the invitation is propagated from the first user device toward the second user device using a signaling multicast group.

19. A method, comprising:
receiving, from a first user device, a request to establish a multicast group, the request comprising a plurality of parameters requested for the multicast group;
obtaining a multicast address for the multicast group;
establishing the multicast group using at least a portion of the parameters, the established multicast group having a plurality of accepted parameters associated therewith; and
propagating the multicast address and the accepted parameters of the multicast group toward the first user device for use by the first user device to invite a second user device to join the multicast group.

20. An apparatus, comprising:

a processor; and a memory storing instructions which, when executed by the processor, cause the processor to perform steps of:

receiving, from a first user device, a request to establish a multicast group, the request comprising a plurality of parameters requested for the multicast group;

obtaining a multicast address for the multicast group;

establishing the multicast group using at least a portion of the parameters, the established multicast group having a plurality of accepted parameters associated therewith; and propagating the multicast address and the accepted parameters of the multicast group toward the first user device for use by the first user device to invite a second user device to join the multicast group.

* * * * *